No. 619,552. Patented Feb. 14, 1899.
E. FOUCHÉ.
MEANS FOR LOCALIZING EXPLOSIONS IN GAS MAINS.
(Application filed Jan. 24, 1898.)
(No Model.)
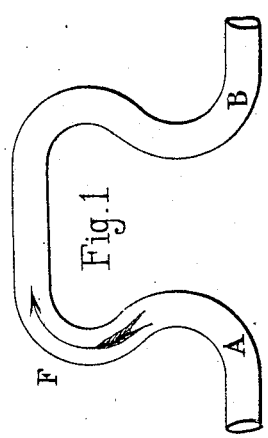
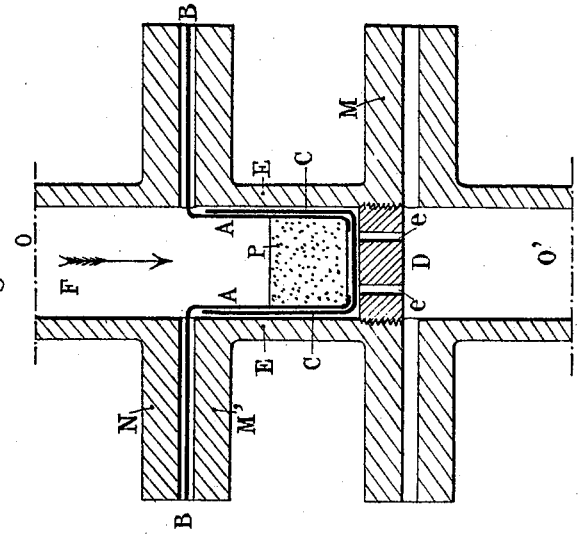
Witnesses
Inventor
Edmond Fouché

UNITED STATES PATENT OFFICE.

EDMOND FOUCHÉ, OF PARIS, FRANCE.

MEANS FOR LOCALIZING EXPLOSIONS IN GAS-MAINS.

SPECIFICATION forming part of Letters Patent No. 619,552, dated February 14, 1899.

Application filed January 24, 1898. Serial No. 667,765. (No model.)

*To all whom it may concern:*

Be it known that I, EDMOND FOUCHÉ, general manager of the Compagnie Française de l'Acétylène Dissous, a citizen of France, residing at Paris, France, have invented certain new and useful improvements in pipes and conduits for localizing the effect of explosions therein, and so minimizing damage therefrom, (for which I have applied for a patent in France, dated December 1, 1897, No. 260,488; in Belgium, dated December 14, 1897, No. 103,156; in Great Britain, dated December 16, 1897, No. 29,805, and in Germany, dated December 16, 1897, No. 7,225, II, 26$^b$,) of which the following is a specification.

This invention relates to pipes or conduits for distributing explosive gases or the like—such, for example, as acetylene gas—and has for its object to localize or confine explosions that may occur therein and prevent them from spreading throughout the system of pipes or conduits.

To this end my invention consists in the features and in the construction, combination, and arrangement of parts hereinafter described, and particularly pointed out in the claims following the description, reference being had to the accompanying drawings, forming a part of this specification, wherein—

Figure 1 is a diagrammatic view illustrating a portion of the pipe-line or conduit. Fig. 2 is a sectional view of one form of device constructed in accordance with my invention.

In pipes or conduits of the class referred to when an explosion of the gas occurs therein the gas does not expand instantaneously throughout the conduit, but requires a brief interval of time, the gas in advance of the exploded or expanded gas being compressed thereby. For example, let it be assumed that an explosion occurs in the conduit at the point indicated by the letter A in Fig. 1. Then a brief interval of time will elapse before the exploded and expanded gas will reach the point B, the duration of course being dependent upon the distance between the two points and the force of the explosion. As the expanded gas travels in the direction of the arrow F toward the point B the gas in advance will be compressed beyond the normal pressure, and this abnormal pressure is utilized in my invention to effect the closure of a normally open obturator and prevent the passage therepast of the exploded and expanded gas, thus confining the effects of the explosion to one portion of the conduit.

Referring to Fig. 2 of the drawings, the letters O O' indicate two sections of the pipe or conduit and E a short pipe-section interposed between the sections O O'. The pipe-sections are provided at their ends with flanges M M' N, by means of which they are united or coupled together in any well-known or ordinary manner. Arranged in the section E is a thin metallic tube A, open at its opposite ends and secured in place by a flange B, formed on one of its ends and inserted between the flanges M' N. As shown, the tube A is of less diameter than the pipe-section E, and over its free end is arranged a tubular cap C, closed at its outer end and of greater diameter than the tube A, but of less diameter than the pipe-section E, whereby a space is formed between the tube A and the cap C and between the latter and the pipe-section E. In the tube A is disposed a body of porous substance P of any suitable kind—such as sand, for example, packed between disks of wire-gauze. In order to prevent the gas from forcing the cap C off from the tube A, I insert a screw-plug D in the end of the pipe-section E and provide it with a plurality of perforations $e$, which permit the free passage of the gas therethrough.

In practice there will be a number of the obturators provided and arranged throughout the conduit at suitable distances or at any desired points. The gas under normal conditions flows through the conduit in the direction indicated by the arrow F and passes through the tube A and its porous filling, through the spaces between said tube and cap, and between the cap and pipe-section E and into the pipe-section O' through the perforated plug D. Should an explosion occur, however, in advance of the obturator, the gas in the pipe O will be compressed before the full effect of the explosion reaches the obturator, and the abnormal pressure of the gas will force or expand the tube A and cap C outwardly against the interior of the pipe-section E, thus effectually closing the same against the passage of the gas and preventing the effects of the explosion from spreading farther.

The porous filling at the time of the explosion creates a strong resistance to the passage of the gas and operates to maintain for a certain interval of time an increased pressure in the pipe-section, insuring the expansion of the tube and cap therein.

In practice I prefer to construct the cap C of some very ductile metal—such as aluminium, for example—whereby the cap can expand against the tube E without danger of splitting, and as the space between the cap C and the tube E is quite small the cap can readily expand to fill the tube and the danger of splitting is minimized.

Having described my invention, what I claim is—

1. The combination with a pipe-section, of an open-ended tube fixed therein, a cap closed at one end fitted over said tube, and means for preventing the removal of said cap, the said tube and cap being of such relative sizes that a space is left between them and between the cap and pipe-section to permit the passage of gas, under normal pressure, and said tube and cap being constructed so as to be expanded and forced outward against the pipe-section under an abnormal pressure of gas, substantially as described and for the purpose specified.

2. The combination with a pipe-section, of an open-ended tube fixed therein, a cap closed at one end fitted over said tube, means for preventing the removal of the cap, and a porous filling disposed within the tube, said tube and cap being of such relative sizes that a space is left between them and between the cap and pipe-section to permit the passage of gas under normal pressure, and said tube and cap being constructed so as to be expanded and forced outward against the pipe-section under an abnormal pressure of gas, substantially as described and for the purpose specified.

3. The combination with a pipe-section, of an open-ended tube fixed therein, a cap closed at one end fitted over said tube, a perforated screw-plug fitted in the pipe-section in front of the cap, and a porous filling disposed within the tube, substantially as described and for the purpose specified.

In testimony whereof I have hereunto set my hand in the presence of two witnesses.

EDMOND FOUCHÉ.

Witnesses:
EDWARD P. MACLEAN,
ALFRED FRELL.